Patented Mar. 3, 1931                                                   1,794,848

UNITED STATES PATENT OFFICE

IVAN GUBELMANN, ROBERT J. GOODRICH, AND EDWARD T. HOWELL, OF SOUTH MILWAUKEE, WISCONSIN, ASSIGNORS, BY MESNE ASSIGNMENTS, TO NEWPORT CHEMICAL CORPORATION, A CORPORATION OF DELAWARE

METHOD FOR THE PURIFICATION OF BENZANTHRONES

No Drawing.    Application filed February 6, 1928.    Serial No. 252,423.

This invention relates to a method for the purification of benzanthrone, or its derivatives, and more particularly to the recovery of a benzanthrone in a highly purified state from the reaction masses obtained by any of the general methods of preparation, such for example as the condensation of an anthranol with glycerol.

It is well known that in the preparation of benzanthrone or derivatives of benzanthrone, as by a condensation of the corresponding anthranol with glycerol in the presence of sulfuric acid, there are produced in addition to the benzanthrone body, varying amounts of by-products. These by-products or impurities remain in the finished product unless an additional step of purification is employed. The impurities usually present in crude benzanthrone may be detected by dissolving the crude benzanthrone in benzene or other suitable solvent, whereupon the bulk of the impurities appear as an insoluble residue. The amounts of impurity present will, of course, vary in accordance with the specific method of preparation used.

Heretofore known methods of purifying the crude benzanthrone to remove the above referred to residues insoluble in benzene have employed such methods as sublimation and recrystallization from a solvent. In the general method of preparation of a crude benzanthrone, of which the procedure described in U. S. Patent No. 1,626,392 is a typical example, and more particularly in the isolation of the benzanthrone, there are employed methods which are relatively bulky and uneconomical, as where the crude benzanthrone reaction mass, which contains the benzanthrone body, concentrated sulfuric acid and impurities, is diluted with a large amount of water, cooled and filtered. The crude filter cake is then resludged with an alkaline solution to extract out the alkali soluble material and is again filtered. In order to remove the residues mentioned above, this partially purified product must be dried, redissolved in a suitable solvent, filtered to remove the insoluble bodies and then fractionally crystallized from the solvent. The various steps in this general method of preparation when working on the large scale, introduce many difficulties and many costly operations, such as large volumes for dilution, an acid filtration and rehandling.

Our proposed method of purification eliminates certain steps in the heretofore known methods of preparation; namely, the steps of drowning, cooling and filtering the crude product, the steps of resludging the product with dilute alkali and filtering and the step of drying before the final purification.

We have found that benzanthrone may be selectively extracted from a benzanthrone condensation mass by diluting the mass to a suitable concentration, making use of the discovery that the impurities present in a crude benzanthrone mass will be retained, during extraction, in sulfuric acid of about 65% strength or below, whereas the benzanthrone is sufficiently insoluble in acid of this concentration or lower to allow its extraction directly with a suitable solvent. In the use of a suitable solvent, we do not wish to limit our invention to any specific one, since we have found that any solvent which is relatively inert and immiscible in sulfuric acid of the above strengths and likewise acts as a selective solvent for the benzanthrone may be employed. Benzene and its substitution products, such as toluene, xylene, and o-dichloro benzene are, in general, satisfactory. However, other solvents of the type exemplified by tetrachlorethane, ethylene dichloride and the like may also be used.

Our method of purification is performed substantially as follows. A reaction mass containing a benzanthrone body (by which is meant benzanthrone or a substitution product of benzanthrone), concentrated sulfuric acid and impurities, as obtained by the condensation of an anthranol body with glycerol, is diluted with water to a sulfuric acid concentration at which the benzanthrone body becomes relatively insoluble in the sulphuric acid and may be extracted by means of a suitable solvent from the sulfuric acid. The condensation mass may be diluted down to lower sulfuric acid concentrations depending upon the amount of impurities present, but in order to avoid the necessity of handling voluminous masses, a dilution to approximately 65% acid concentration is preferred. The mass is then continuously extracted with a suitable solvent, whereby the benzanthrone body is dissolved out of the mass, leaving the residues retained in the sulfuric acid. The extract, in order to avoid the use of large amounts of solvent, is preferably continuously separated and the solvent evaporated off from the extract and returned to the extraction mass. This is continued until practically all of the benzanthrone body has been separated from the sulfuric acid. The separated extract may then be evaporated to dryness, whereby the benzanthrone body is obtained in sufficient purity for use in the manufacturing of dyestuffs, or by fractional crystallization, the benzanthrone body may be obtained in the highest state of purity.

Without limiting our invention to any specific procedure, the following example serves to illustrate the preferred form of our method.

A benzanthrone reaction mass as produced by known methods, containing the benzanthrone and impurities in concentrated sulfuric acid, is treated as follows:

The mass is cooled to about 60° C. and there is then added sufficient water, holding the temperature of the mass below 60° C. during the dilution, to give a sulfuric acid of about 65% strength calculated on the basis of the entire mass less the organic matter. The diluted mass is then extracted with toluene at about 60° C. For convenience, the extracts are removed continuously and replaced with fresh toluene by trickling the latter upwardly through the mass. Likewise, the extracts are evaporated continuously and the distillate added to the extraction mass as fresh toluene. The extraction is continued until practically all of the benzanthrone has been dissolved away from the sulfuric acid and impurities. The accumulated extract is then further evaporated to the crystallizing point of the benzanthrone and fractionally crystallized, or the toluene solution may be evaporated to dryness.

Although 65% sulfuric acid concentration has been found preferable when working with benzanthrone condensation masses as generally prepared, we do not wish to limit our invention to any particular acid concentration as any suitable concentration may be used. By the term "suitable" sulfuric acid concentration, as used here and in the claims, is meant a concentration such that the benzanthrone body is substantially insoluble whereas the impurities will be largely retained by the sulfuric acid during the subsequent extraction. The proper concentration to use will likewise be influenced by the amount of impurities present in the benzanthrone mass, which obviously will depend upon the particular process employed for making the benzanthrone.

Other derivatives of benzanthrone, as for example methyl benzanthrone and the like, may be isolated in a similar manner.

We are aware of the fact that the specific conditions outlined in the above method may be varied through a wide range, as for example, in respect to the specific temperature and specific concentration of sulfuric acid employed. We therefore do not purpose limiting the patent granted hereon other than as necessitated by the prior art.

We claim as our invention:

1. The process of preparing a benzanthrone body in a high state of purity, which comprises extracting a mass containing the benzanthrone body and impurities in sulphuric acid with a solvent for the benzanthrone body immiscible with the sulphuric acid, the concentration of the sulphuric acid being such that the benzanthrone body is relatively insoluble therein under the conditions obtaining, separating the solution of the benzanthrone body thus formed, and recovering the benzanthrone body from said solution.

2. The process of preparing benzanthrone in a high state of purity from a mass containing benzanthrone and naturally occurring impurities in sulphuric acid of up to about 65% concentration, which comprises extracting the benzanthrone contained in said mass by means of a selective solvent for benzanthrone added to said mass and immiscible with the sulphuric acid, and recovering the benzanthrone from the extract.

3. The process of preparing a benzanthrone body in a high state of purity, which comprises extracting a mass containing the benzanthrone body and impurities in sulphuric acid with a liquid added to said mass and capable of dissolving the benzanthrone body but not the impurities and immiscible with the sulphuric acid, the concentration of the sulphuric acid being such that the benzanthrone body is relatively insoluble therein under the conditions obtaining, separating the solution of the benzanthrone body thus formed and recovering the benzanthrone body from said solution.

4. The process of preparing a benzanthrone body in a high state of purity, which comprises extracting a mass containing the benzanthrone body and impurities in sulphuric acid with toluene, the concentration of the sulphuric acid being such that the benzanthrone body is relatively insoluble therein under the conditions obtaining, separating the solution of the benzanthrone body in the toluene, and recovering the benzanthrone body from said solution.

5. The process of preparing benzanthrone in a high state of purity from a mass containing benzanthrone and naturally occurring impurities in concentrated sulphuric acid, which comprises diluting the mass to a concentration of sulphuric acid in which benzanthrone is relatively insoluble, extracting the benzanthrone contained in said diluted mass by means of a selective solvent for the benzanthrone added to said mass, said solvent being immiscible with the sulphuric acid, and recovering the benzanthrone from the extract by evaporation of the solvent.

6. The process of isolating benzanthrone from a reaction mass comprised of benzanthrone and impurities in concentrated sulphuric acid, which comprises diluting the mass with water to a concentration of sulphuric acid in which benzanthrone is relatively insoluble, extracting the benzanthrone contained in the diluted mass by means of a selective solvent for benzanthrone immiscible with sulphuric acid and recovering the benzanthrone from the solvent.

7. The process of isolating benzanthrone from a reaction mass comprised of benzanthrone and impurities in concentrated sulphuric acid, which comprises diluting the mass to a sulphuric acid concentration of approximately 65%, extracting the benzanthrone contained in the diluted mass by means of a selective solvent for benzanthrone immiscible with sulphuric acid of that strength and recovering the benzanthrone from the solvent.

8. The process of isolating benzanthrone from a reaction mass comprised of benzanthrone and impurities in concentrated sulphuric acid, which comprises diluting the mass to a sulphuric acid concentration of approximately 65%, extracting the benzanthrone contained in the diluted mass with toluene and receiving the benzanthrone from the toluene.

9. The process of preparing benzanthrone in a high state of purity, which comprises diluting a reaction mass containing benzanthrone and impurities in concentrated sulphuric acid to an acid concentration of approximately 65%, extracting the diluted mass at approximately 60° C. with toluene to obtain a solution of benzanthrone in toluene, separating said benzanthrone solution from the sulfuric acid and the impurities retained therein and recovering the benzanthrone from its solution.

10. The process of preparing benzanthrone in a high state of purity, which comprises diluting a reaction mass containing benzanthrone and impurities in concentrated sulphuric acid to a sulphuric acid concentration in which benzanthrone is relatively insoluble, extracting the diluted mass with toluene to obtain a solution of benzanthrone in toluene, separating said benzanthrone solution from the sulphuric acid and the impurities retained therein and recovering the benzanthrone from its solution.

11. The process of obtaining benzanthrone in a high state of purity from a reaction mass containing benzanthrone and impurities in concentrated sulfuric acid, which comprises diluting the reaction mass to a sulfuric acid concentration of approximately 65%, continuously passing toluene upwardly through the diluted reaction mass maintained at a temperature of about 60° C. to extract the benzanthrone from said mass, continuously removing the toluene solution of benzanthrone thus formed, distilling off a part of the toluene from said solution, reusing the toluene distillate for fresh extraction of benzanthrone and finally recovering the benzanthrone from the toluene.

In testimony whereof we have hereunto subscribed our names at Carrollville, Milwaukee County, Wisconsin.

IVAN GUBELMANN.
ROBERT J. GOODRICH.
EDWARD T. HOWELL.